R. A. GOETH.
AUTOMOBILE PUMP.
APPLICATION FILED AUG. 20, 1909.
950,283.
Patented Feb. 22, 1910.
2 SHEETS—SHEET 1.
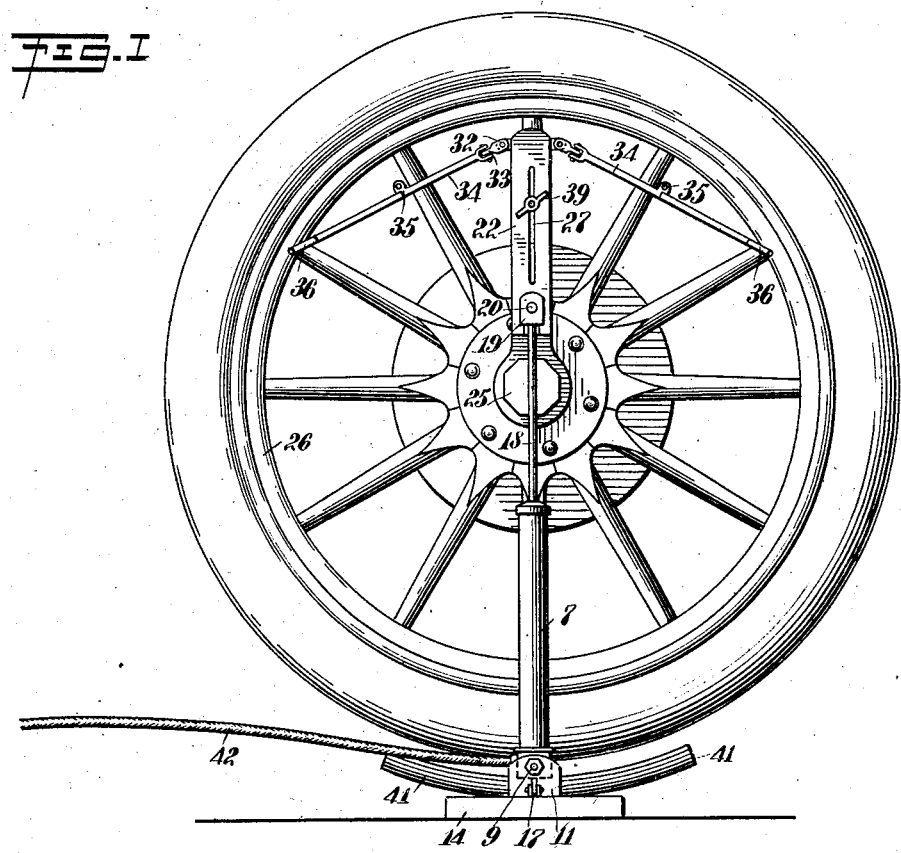
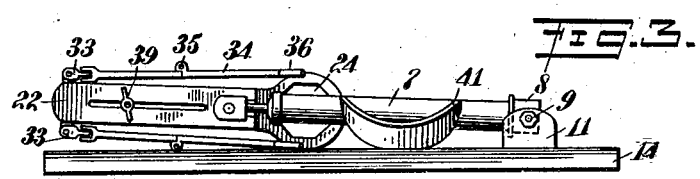
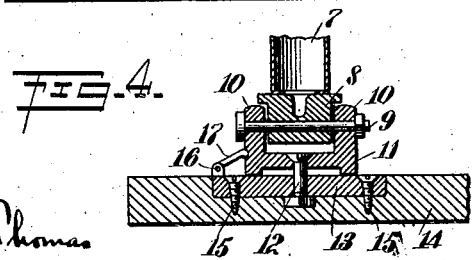
WITNESSES
INVENTOR
Richard A. Goeth
BY
ATTORNEYS

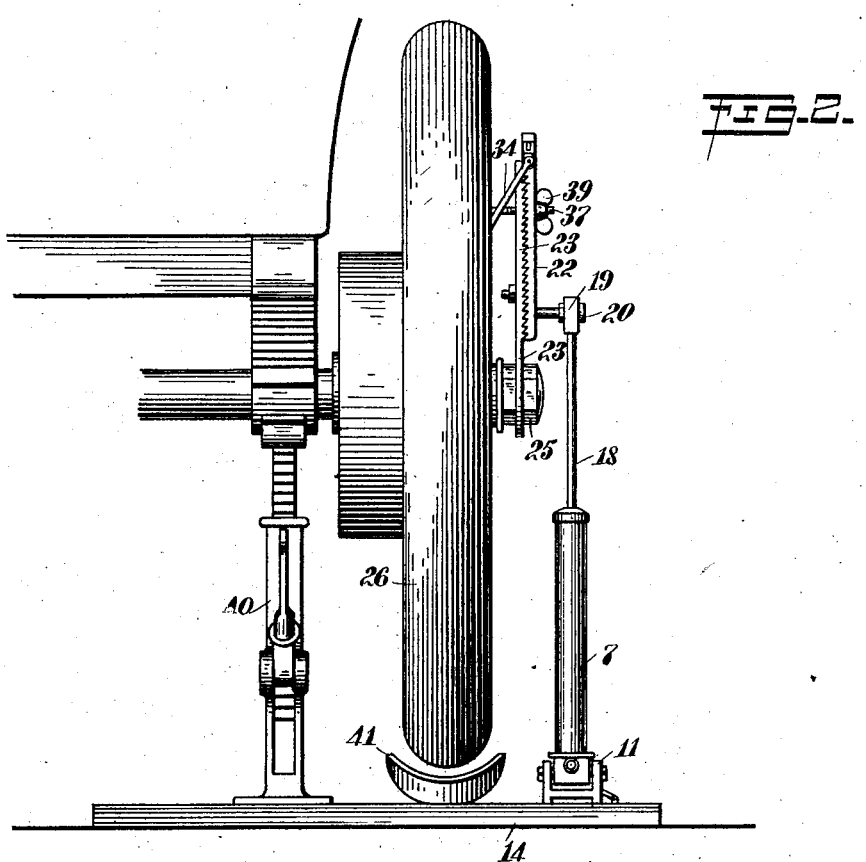
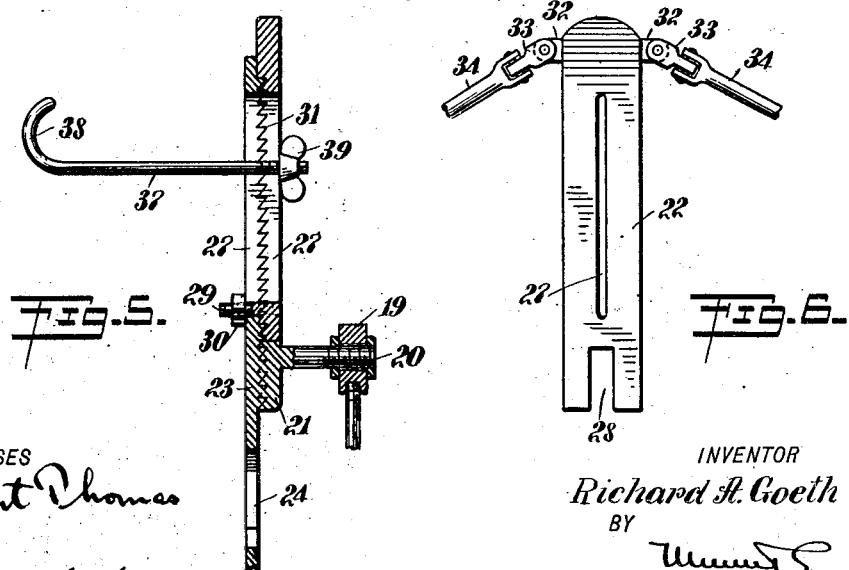

UNITED STATES PATENT OFFICE.

RICHARD ANTON GOETH, OF SAN ANTONIO, TEXAS.

AUTOMOBILE-PUMP.

950,283.  Specification of Letters Patent.  Patented Feb. 22, 1910.

Application filed August 20, 1909. Serial No. 513,877.

*To all whom it may concern:*

Be it known that I, RICHARD ANTON GOETH, a citizen of the United States, and a resident of San Antonio, in the county of Bexar and State of Texas, have invented a new and Improved Automobile-Pump, of which the following is a full, clear, and exact description.

Among the principal objects which the present invention has in view are: to provide a pumping attachment which may be readily and quickly mounted upon a driving wheel of an automobile; to provide a pumping apparatus which is held in operative position by the weight of the automobile during the adjustment and subsequent operation; and to provide a structure which is economical, simple and durable.

One embodiment of the present invention is disclosed in the structure illustrated in the accompanying drawings, in which like characters of reference denote corresponding parts in all the views, and in which—

Figure 1 is a side elevation of an automobile driving wheel shown in conjunction with a pumping apparatus constructed and arranged in accordance with the present invention; Fig. 2 is an edge view of an automobile wheel showing in conjunction therewith a fragment of an automobile raised upon an ordinary lifting jack, and with a pumping apparatus constructed and arranged in accordance with the present invention; Fig. 3 is a side view of the pumping apparatus constructed in accordance with the present invention, and assembled in its knock-down or carrying position; Fig. 4 is a detail view in section showing the mounting of the pump upon the base plate; Fig. 5 is a detail view in section of the crank pin carrying arm and expansible connection; and Fig. 6 is a front view of the expansible connection.

The present apparatus comprises an air pump of any desired style or operation. The pump casing 7 is mounted upon a base 8, which is pivotally mounted upon a bolt 9 extended through up-turned ears 10, 10 of a holder 11, which is pivotally mounted by means of a bolt 12 upon a riding plate 13. The plate 13 is let into a base plate 14 when the same is made of wood, as shown in the accompanying drawings, and secured thereto by means of screws 15, 15. When the base plate 14 is constructed from metal the plate 13 may be mounted upon seating pads of usual construction. Extended upward from the plate 13 are ears 16, 16 in which is pivotally mounted a pivoted latch 17 adapted to fall into and seat in a groove or slot formed in the side of the holder 11.

The purpose of the above construction and arrangement is to permit the pump casing 7 to rock within the holder 11, due to the throw of the piston rod of the pump as the same is moved about the center of the wheel of the automobile to which it is attached. Also, it is desired that the holder 11 may be so disposed with reference to the plate 14 that the casing 7 may be laid lengthwise of the said plate 14 when the apparatus is knocked down for storage. It is to prevent the holder 11 from rotating upon the bolt 12 that I have provided the latch 17. When the latch 17 is in engagement with the holder 11 the casing 7 is in pumping position. The piston rod 18 of the pump is provided with a bearing plate 19 to receive a crank pin 20. The crank pin 20 is extended from a projection 21 which further forms a guide for the seating of an expansion plate 22. The pin 20 and projection 21 are carried upon a plate 23. The plate 23 is provided in the lower end with an opening 24 octagonal in shape to fit a cap nut 25 of a wheel 26. The shape and size of the opening 24 may be altered to suit the size and shape of the cap nut used on any individual automobile. The plates 22 and 23 are both provided with slots 27, 27. The plate 22 is also provided with a slot 28 which extends at each side of and is guided by the projection 21. Extended from the plate 22 is a screw threaded bolt-like projection 29 upon which is screwed a nut 30. When the plates 22 and 23 are assembled the sides forming the slot 28 are extended at each side of the projection 21 and the projection 29 is inserted through the slot 27 in the plate 23, in which position the nut 30 is screwed upon the said projection 29, locking the plates 22 and 23 together. The abutting faces of the plates 22 and 23 are serrated to form teeth 31 which mesh when the said plates are drawn together by the nut 30. The upper end of the plate 22 is provided with ears 32, 32 upon which are pivotally mounted links 33, 33 to receive thrust rods 34, 34. The links 33, 33 are formed, as shown, to produce at the connection between the rods 34, 34 and the plate 22, a flexible knuckle joint whereby the rods may assume any position relative to the plane of the wheel 26 or of the spread of the said rods 34, 34. The rods 34, 34 may be formed in any desired manner, that shown in the present drawings as preferred by me having a break joint 35 whereby the rods 34 may be folded to occupy less space in packing. At the free end the rods 34, 34 are provided with yokes 36, 36 adapted to extend over the spokes of the wheel 26 or the felly of the same.

Extended through the slots 27, 27 is an anchor bolt 37, on the end of which is provided a hook 38 adapted to extend around and engage one of the spokes of the wheel 26. The end of the bolt 37 is screw threaded, upon the threaded end whereof is mounted a wing nut 39.

The base plate 14 is elongated, as shown in Fig. 2 of the drawings, near the one end of which is mounted the holder 11 and the pump casing 7. It is intended that the plate 14 shall be long enough to receive the foot of a jack 40. Between the holder 11 and the jack 40 is mounted on the plate a scoop-shaped shoe 41.

Having an apparatus thus constructed the operation is as follows: The plate 14 is dipped until the end of the shoe 41 touches the ground in advance of the wheel 26. The wheel 26 is then rolled on to the shoe 41 which rocks the plate 14 back to a full seating position. In this position the plates 22 and 23 are raised until the opening 24 is passed over the nut 25. The rods 34 are then unlimbered to extend so that the yokes 36, engage convenient spokes of the wheel 26, resting in the crotch of the joint between the said spokes and the felly of the said wheel. The rods 34 are then strained, the nut 30 having been loosened so that the plates 22 and 23 are not held in rigid contact. It is by means of the plate 22, by raising and lowering upon the plate 23, that the adjustment of the combined plates 22 and 23 and the rods 34, 34 is made to conform to the wheel 26. This having been accomplished the bolt 37 is extended until the hook 38 passes behind the spoke with which the plates 22, 23 are alined. By turning the nut 39 the bolt 37 is caused to draw upon the spoke with which it is connected. Continued operation of the nut 39 tightens all of the connections by reason of the tripod arrangement of the plates 22, 23 and rods 34, 34. The apparatus is now in position to operate. The operation consists in first lifting, by means of the jack 40, the wheel 26 from the shoe 41. The engine is now started and the speed of rotation of the wheels is regulated by means of the speed gears to operate the pump rapidly or slowly, as may be desired.

It will be understood that the pump is provided with a flexible pipe connection 42 whereby it is attached to the hollow tubing of the automobile tire.

It will be seen that by means of this construction and arrangement a tire may be rapidly expanded and that the force of expansion may be far in excess of that produced by manual operation. By using a speed attachment of any of the well known types the bursting of tires due to excessive pressure may be avoided.

Having thus described my invention, what I claim as new and desire to secure by Letters Patent is:—

1. An automobile pump, comprising a pump having a reciprocating plunger; a base plate to form a rest for a lifting jack and said pump; a removable plate having a perforation to centrally engage a driving wheel of an automobile and provided with an extended arm having a crank pin pivotally engaged with said plunger; and means to hold the said plate on said wheel.

2. An automobile pump, comprising a pump having a reciprocating plunger; a base plate to form a rest for a lifting jack and said pump; a removable plate having a perforation to centrally engage a driving wheel of an automobile and provided with an extended arm having a crank pin pivotally engaged with said plunger; and fastening means to hold said plate on said wheel, embodying an extensible member adapted to be clamped to said plate, lateral extended braces to hold the plate in line, and a hook to engage the spoke of said wheel to hold the said plate against the same.

3. An automobile pump, comprising a pump having a reciprocating plunger; a base plate to form a rest for a lifting jack and said pump, said base plate being secured to said pump; a removable plate having a perforation to centrally engage a driving wheel of an automobile and provided with an extended arm having a crank pin pivotally engaged with said plunger; and means to hold the said plate on said wheel, embodying extensible lateral brace rods adapted to engage the spokes of said wheel where they enter the felly thereof.

4. An automobile pump, comprising an elongated base plate adapted to extend at both sides of the driving wheel of an automobile; a pump having a reciprocating plunger and mounted upon the said base plate to swing with the said plunger when the same is attached to the said wheel; a removable plate adapted to be fixedly secured to the said driving wheel and provided with a crank pin to pivotally engage said plunger; and means to hold the said plate on said wheel.

5. An automobile pump, comprising an elongated base plate adapted to extend at both sides of the driving wheel of an automobile and to form a rest for a lifting jack; an air pump having a reciprocating plunger; a removable plate adapted to be fixedly secured to the said driving wheel and provided with a crank pin to pivotally engage said plunger; a mounting device for said pump, pivotally secured upon the said base plate and forming a hinge bearing for the said pump; and means to hold the said plate on said wheel.

6. An automobile pump, comprising an elongated base plate adapted to extend at both sides of the driving wheel of an automobile and to form a rest for a lifting jack when operating between the wheels of said automobile; a pump having a reciprocating plunger; a mounting for said pump being hingedly secured thereto, said mounting being pivotally secured on said base plate; a device having a crank pin adapted to be temporarily secured to the driving wheel of an automobile; and a fastening device for holding the said mounting for the said pump in fixed relation to the said base plate.

In testimony whereof I have signed my name to this specification in the presence of two subscribing witnesses.

RICHARD ANTON GOETH.

Witnesses:
C. A. GOETH,
J. G. NAGLE.